Sept. 6, 1938.    W. J. HAJEK    2,129,272
HEATING SYSTEM
Filed June 12, 1935
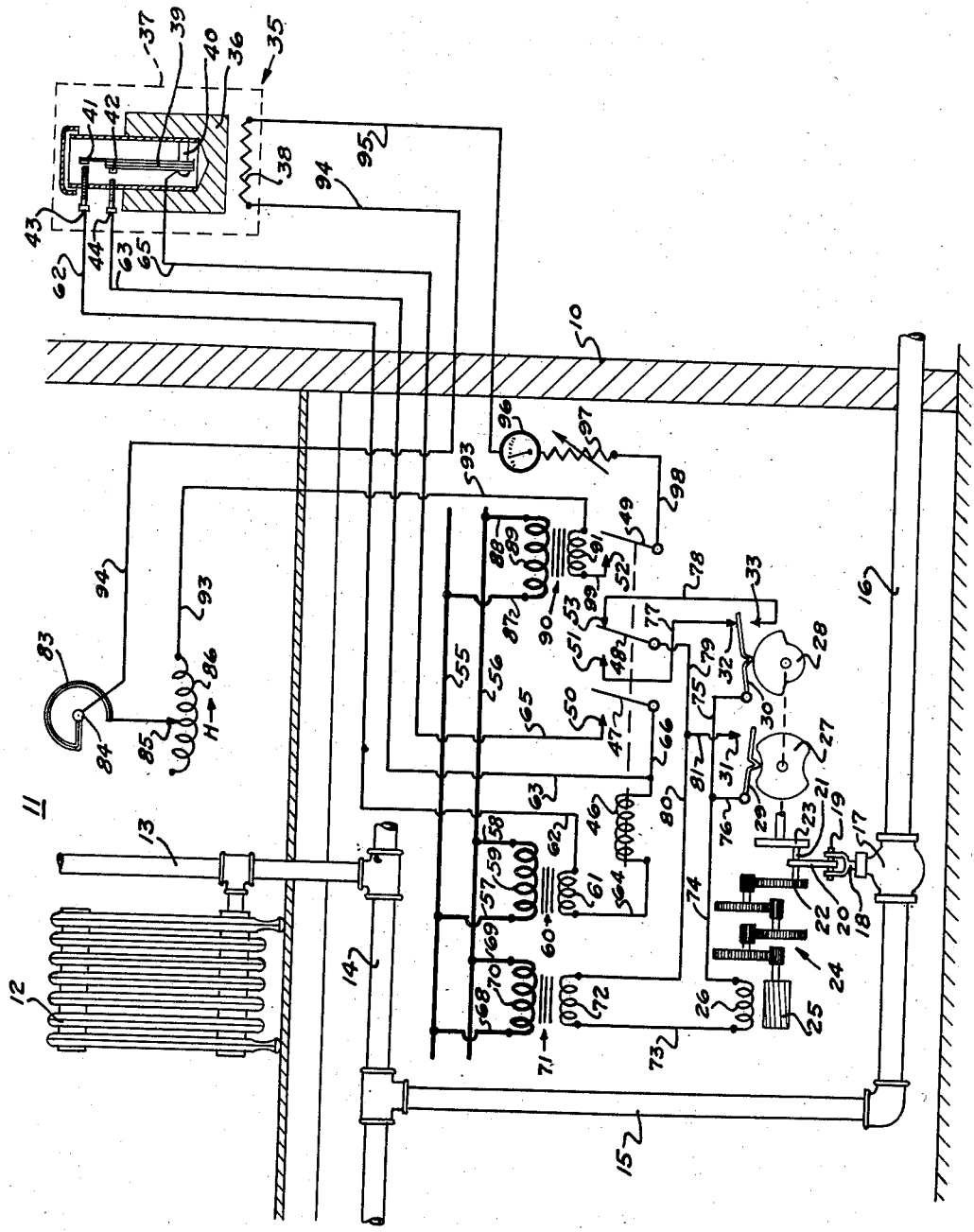
INVENTOR
*William J. Hajek*
BY HIS ATTORNEY
*George H. Fisher*

Patented Sept. 6, 1938

2,129,272

UNITED STATES PATENT OFFICE 2,129,272

HEATING SYSTEM

William J. Hajek, Brookline, Mass., assignor to Minneapolis-Honeywell Regulator Company, Minneapolis, Minn., a corporation of Delaware Application June 12, 1935, Serial No. 26,183

4 Claims. (Cl. 236—91)

This invention relates to heating systems of the type disclosed in the application of Daniel G. Taylor, Serial No. 512,887, filed February 2nd, 1931, Patent No. 2,065,835 dated December 29, 1936.

The system disclosed in the above referred to Taylor application comprises an outdoor controller responsive to outdoor atmospheric conditions including temperature, wind and solar radiation for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outdoor controller. Due to the proportional relationship of the heating means with the heat losses of the building and the outside controller, a definite temperature relationship is maintained within the building and the outdoor controller so that by responding to the temperature of the outdoor controller the thermostatic device maintains a constant or normal temperature within the building.

This mode of operation as disclosed in the above referred to Taylor application is based on the assumption that the demand for heat in the building bears a substantially constant ratio with the demand for heat by the outdoor controller. In other words, the Taylor system does not account for changes in the heating load of the building which are caused by various uncontrollable factors. For example, these changes in heating load may be caused by the congregation of a large number of persons in the building whereby body heat causes raising of the building temperature with a consequent decrease in required heating load. Also opening of doors and windows increases the heat loss from the building, lowering the temperature therein and causing an increase in the required heating load. These changes in heating load caused by these uncontrollable factors are very prominent in large structures and tend to vary the temperature within the building a considerable amount.

It is therefore an object of this invention to provide means whereby the temperature within the building may be maintained at normal in accordance with outdoor atmospheric conditions irrespective of the changing heating load conditions in the building as caused by the number of people being present within the building and the effect of opening windows and doors and the like.

More specifically, it is an object of this invention to control the temperature of the building by means of an outdoor controller and to provide means for adjusting the outdoor controller in accordance with temperature conditions existing within the building.

It is a further object of this invention to provide a heating means for a building, an outdoor controller for controlling the heating means to maintain a normal temperature within the building in accordance with outdoor atmospheric conditions and means for adjusting the outdoor controller in accordance with the temperature within the building to maintain the temperature within the building constant regardless of temperature changing factors that may exist within the building.

Other objects and advantages will become apparent to those skilled in the art upon reference to the accompanying specification, claims and drawing, in which drawing is diagrammatically illustrated the preferred form of my invention.

My invention is shown as applied to a building, having an outside wall 10 and a plurality of spaces to be heated, one of which is shown at 11. In each of the spaces to be heated is located a heat exchanger or radiator 12 which receives its supply of heating fluid from a riser 13. The riser 13 is connected into a header 14 which receives its supply of heating fluid from a pipe 15. Heating fluid emanating from some source, not shown, is supplied to the pipe 15 by a pipe 16. The source of heating fluid may be a central heating plant, a constantly energized boiler or any other known device. A valve 17 controls the supply of heating fluid from the supply pipe 16 so that when the valve 17 is opened heating fluid is supplied through the above described piping system to the radiators 12 and when the valve 17 is closed, the further supply of heating fluid to the radiators 12 is prevented.

The valve 17 is operated by a valve stem 18 which is connected to one end of a pitman 20 by means of a pin 19. The other end of the pitman 20 is connected to a crank pin 21 carried by a gear 22 and a crank disc 23. The gear 22 and consequently the crank disc 23 is driven through a reduction gear train 24 by a motor rotor 25 upon energization of a field 26. The crank disc 23 drives cams 27 and 28. The cams 27 and 28 operate contact arms 29 and 30, respectively. When the high dwells of the cam 27 engage the contact arm 29, the contact arm 29 is moved into engagement with a contact 31. When the high dwell of cam 28 engages the contact arm 30, the contact arm 30 is moved into engagement with a contact 32 and when the low dwell of the cam 28 becomes operative, the contact arm 30 moves into engagement with a contact 33.

Located outside of the building in any suitable manner is an outdoor controller 35 which comprises a metallic block 36 enclosed within a weather-tight casing 37. The metallic block 36 is heated by means of a heater 38 and cooled by the outdoor atmosphere. The metallic block 36 is preferably hollowed out to receive a bimetallic element 39 which is secured in place within the block 36 by means of a post 40. The bimetallic element 39, therefore, responds directly to the temperature of the metallic block 36. The bimetallic element 39 carries contacts 41 and 42 which are adapted to sequentially engage adjustable contacts 43 and 44 since the distance between contacts 41 and 43 is less than the distance between contacts 42 and 44.

A relay coil 46 controls the operation of switch arms 47, 48 and 49 so that upon energization of the relay coil 46, the switch arms 47, 48 and 49 are moved to the left into engagement with contacts 50, 51 and 52, respectively, and upon deenergization of the relay coil 46, the switch arms 47, 48 and 49 are moved to the right out of engagement with their respective contacts by means of springs, gravity or other means, not shown. Right-hand movement of switch arm 48 upon deenergization of the relay coil 46 causes engagement of the switch arm 48 with a contact 53.

Line wires leading from some source of power, not shown, are designated at 55 and 56. Wires 57 and 58 connect a primary 59 of a step-down transformer 60, having a secondary 61, across the line wires 55 and 56, respectively. One end of the secondary 61 is connected by a wire 62 to the adjustable contact 43 of the outdoor controller 35. The adjustable contact 44 is connected by a wire 63 to one end of the relay coil 46. The other end of the relay coil 46 is connected by a wire 64 to the other end of the secondary 61. The bimetallic element 39 of the outdoor controller 35 is connected by a wire 65 to the contact 50. The switch arm 47 is connected by a wire 66 to the junction of the wire 63 and the relay coil 46.

When the temperature of the metallic block 36 of the outdoor controller 35 falls below a predetermined value, contact 41 engages contact 43 and contact 42 subsequently engages contact 44 to complete a circuit from the secondary 61 of the step-down transformer 60 through wire 62, contacts 43, 41, 42 and 44, wire 63, relay coil 46 and wire 64 back to the secondary 61 to energize the relay coil 46. The switch arms 47, 48, and 49 are thereby moved into engagement with the contacts 50, 51 and 52, respectively. When the switch arm 47 moves into engagement with the contact 50, a maintaining circuit is completed from the secondary 61 through wire 62, contacts 43 and 41, bimetallic element 39, wire 65, contact 50, switch arm 47, wire 66, relay coil 46 and wire 64 back to the secondary 61 to maintain the relay coil 46 energized even though contact between the contacts 42 and 44 may be subsequently broken. When the temperature of the metallic block 36 rises above a predetermined value in a manner to be pointed out hereafter, contact between the contacts 41 and 43 is broken to break the above mentioned maintaining circuit to cause deenergization of relay coil 46 and consequent movement of the switch arms 47, 48 and 49 to the right.

Wires 68 and 69 connect a primary 70 of a step-down transformer 71, having a secondary 72, across the line wires 55 and 56, respectively. One end of the secondary 72 is connected by a wire 73 to one end of the field 26. The other end of the field 26 is connected by wires 74 and 75 to the contact arm 30. A wire 76 connects the contact arm 29 to the junction of wires 74 and 75. The contact 32 of the valve motor is connected by a wire 77 to the contact 51 and the contact 33 of the valve motor is connected by a wire 78 to the contact 53. The switch arm 48 is connected by wires 79 and 80 to the other end of the secondary 72 of the step-down transformer 71. A wire 81 connects the contact 31 of the valve motor to the junction of wires 79 and 90.

When the switch arm 48 is moved to the left into engagement with the contact 51 upon energization of the relay coil 46, a circuit is completed from the secondary 72 of the step-down transformer 71 through wires 80 and 79, switch arm 48, contact 51, wire 77, contact 32, contact arm 30, wires 75 and 74, field 26 and wire 73 back to the secondary 72. Completion of this circuit causes energization of field 26 and consequent rotation of the rotor 25 to move the valve 17 to its open position. When the valve 17 has started its opening movement, the cam 27 moves the contact arm 29 into engagement with the contact 31 to complete a maintaining circuit from the secondary 72 through wires 80 and 81, contact 31, contact arm 29, wires 76 and 74, field 26 and wire 73 back to the secondary 72 to insure complete opening movement of the valve 17. When the valve 17 has been completely opened in this manner, the contact arm 29 is moved out of engagement with the contact 31 to break the above referred to maintaining circuit and the contact arm 30 is moved into engagement with the contact 33 to position the valve motor for closing operation. Therefore, when the relay coil 46 is energized, heating fluid is supplied to the radiators 12 to supply heat to the building to maintain the temperature of the building constant.

Upon deenergization of the relay coil 46 caused by lowering of the temperature of the metallic block 36 below a predetermined value, the switch arm 48 is moved into engagement with the contact 53 to complete a circuit from the secondary 72 through wires 80 and 79, switch arm 48, contact 53, wire 78, contact 33, contact arm 30, wires 75 and 74, field 26, and wire 73 back to the secondary 72. Completion of this circuit causes energization of the field 26 and consequent rotation of rotor 25 to move the valve 17 to its closed position. The cam 27 again moves the contact arm 29 into engagement with the contact 31 to complete a maintaining circuit to insure complete closing movement of the valve 17. When the valve 17 has been completely closed, the contact arm 29 moves out of engagement with the contact 31 to break the above maintaining circuit and the contact arm 30 moves into engagement with the contact 32 to position the valve motor for opening operation. Therefore, when the relay coil 46 is deenergized, the valve 17 is closed to prevent the further supply of heat to the building.

Located in one of the rooms to be heated 11 is a thermostat 83 mounted on a post 84. The thermostat 83 carries a slider 85 which cooperates with a resistance 86. Upon a rise in temperature in the space to be heated, the slider 85 is moved to the right with respect to the resistance 86 and upon a drop in temperature, the slider 85 is moved to the left with respect to the resistance 86.

Wires 87 and 88 connect a primary 89 of a step-down transformer 90, having a secondary 91, across the line wires 55 and 56, respectively. One end of the secondary 91 is connected by a wire 93 to one end of the resistance 86. The thermostat 83 is connected by a wire 94 to one end of the heater 38 of the outdoor controller 35. The other end of heater 38 is connected by a wire 95 to an ammeter 96 which in turn is connected to one end of a variable resistance 97. The other end of the variable resistance 97 is connected by a wire 98 to the switch arm 49. The contact 52 which cooperates with the switch arm 49 is connected by a wire 99 to the other end of the secondary 91. When the temperature of the block 36 of the outdoor controller 35 falls below a predetermined value to energize the relay coil 46, the switch arm 49 moves into engagement with the contact 52 to complete a circuit from the secondary 91 through wire 93, resistance 86, slider 85, thermostat 83, wire 94, heater 38, wire 95, ammeter 96, variable resistance 97, wire 98, switch arm 49, contact 52 and wire 99 back to the secondary 91. Completion of this circuit causes energization of the heater 38 and consequent raising of the temperature of the block 36. When the temperature of block 36 has risen to a predetermined value under the action of heater 38, contact between the contacts 41 and 43 is broken to deenergize the relay 46 to move the switch arm 49 out of engagement with the contact 52 to break the above referred to circuit which prevents the supply of heat to the metallic block 36. In this manner, the bimetallic element 39 maintains the temperature of block 36 at a substantially constant normal value. The variable resistance 97 and the ammeter 96 provide a means for adjusting and visually indicating the amount of heat delivered to the metallic block 36. The variable resistance 97 is so adjusted that the amount of heat delivered to the outdoor controller 35 is to the amount of heat delivered to the building as the amount of heat loss from the outdoor controller 35 is to the amount of heat loss from the building. By reason of this proportional arrangement, the temperature of the building is maintained at a substantially constant normal value since the bimetallic element 39 which responds to the temperature of the block 36 controls both the supply of heat to the building and to the outdoor controller 35.

As pointed out above, the amount of heat delivered to the building may be excessive at times or deficient at other times due to various factors as body heat of persons congregating within the building or opening of the windows and doors of the building. To remedy this occasional faulty operation of the system, I have provided a thermostatically operated variable resistance responsive to the temperature within the building for controlling the supply of heat to the outdoor controller to maintain the temperature within the building constant regardless of these extraordinary conditions that occur from time to time. It will be seen that when the temperature within the building is caused to rise by one of these variable factors such as the congregating of people within the building, the thermostat 83 moves the slider 85 to the right which decreases the amount of resistance in the circuit of the outdoor controller heater 38 to increase the heating effect of the heater 38. In this manner, the amount of heat delivered to the outdoor controller under these conditions is increased and since the building heating means is under the control of the outdoor controller 35, the amount of heat delivered to the building is thereby proportionately decreased under these conditions. In this manner, the temperature of the building is maintained constant even though uncontrollable factors come into play to tend to increase the temperature within the building.

In a like manner, when the temperature of the building is decreased as by the opening of windows or doors, the thermostat 83 moves the slider 85 to the left to place more resistance in circuit with the outdoor controller heater 38 to decrease the amount of heat delivered to the outdoor controller 35. Since the building heating means is responsive to the temperature of the outdoor controller 35, and since the amount of heat delivered to the outdoor controller 35 is decreased, the amount of heat delivered to the building is thereby proportionately increased. In this manner, additional heat is supplied to the building to maintain the temperature of the building normal even though conditions occur within the building which tend to lower the temperature thereof.

Although I have disclosed the adjusting means for the outdoor controller as being a thermostat responsive to the temperature existing within the building, it is possible to make this adjusting means responsive to other conditions which indirectly reflect the temperature within the building.

Although I have disclosed one form of my invention for purposes of illustration, I do not intend to be so limited since other modifications may become apparent to those skilled in the art. My invention is to be construed only by the scope of the appended claims and the prior art.

I claim as my invention:

1. In a system of the class described, temperature changing means for a building, an outdoor controller having temperature changing means and thermostatic means, the thermostatic means controlling both temperature changing means to maintain the temperature of the building substantially constant, and a thermostatically operated variable resistance responsive to the building temperature for adjusting the outdoor controller temperature changing means.

2. A building exposed to outdoor atmospheric conditions and means to vary its temperature, an enclosure exposed to the same outdoor atmospheric conditions and means to vary its temperature, means responsive to the temperature of the enclosure for controlling both of the temperature varying means to maintain substantially constant temperatures in the building and the enclosure, and means responsive to the temperature of the building for graduatingly adjusting the temperature changing effect of the enclosure temperature varying means.

3. In a heating system of the class described, a building to be heated, a control station of substantial mass outside of the building and of a volume extremely less than the volume of the building and subject to meteorological conditions which also affect the building, heating means for supplying heat to the building and to the control station in proportion to their relative heat losses, a control device responsive to the temperature of the control station for controlling the operation of the heating means, and means responsive to the temperature of the building for varying the proportion of heat supplied to the building and to the control station.

4. In a system of the class described, temperature changing means for a building, an outdoor controller having an electric heating means therefor and a thermostatic means, the thermostatic means of the outdoor controller controlling both the temperature changing means for the building and the electric heating means of the outdoor controller to maintain the temperatures of the building and the outdoor controller substantially constant, and a thermostatically operated variable resistance responsive to the building temperature for adjusting the heating action of the electric heating means for the outdoor controller.

WILLIAM J. HAJEK.